UNITED STATES PATENT OFFICE.

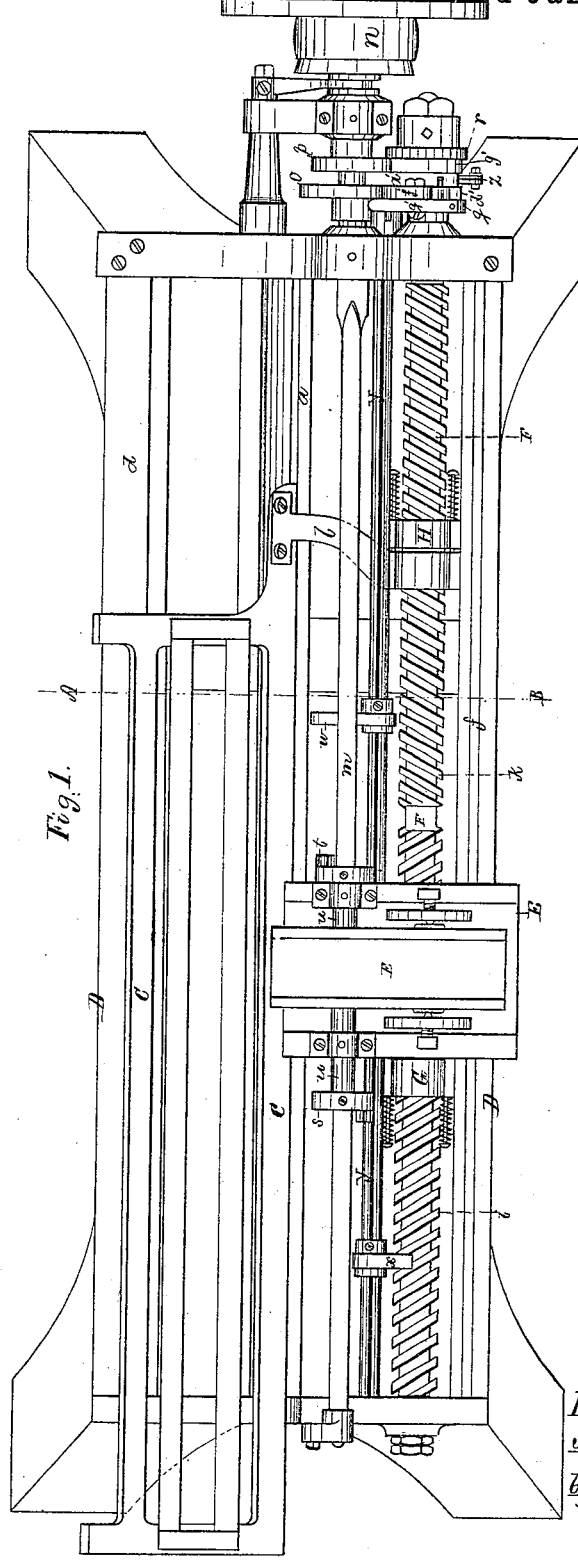

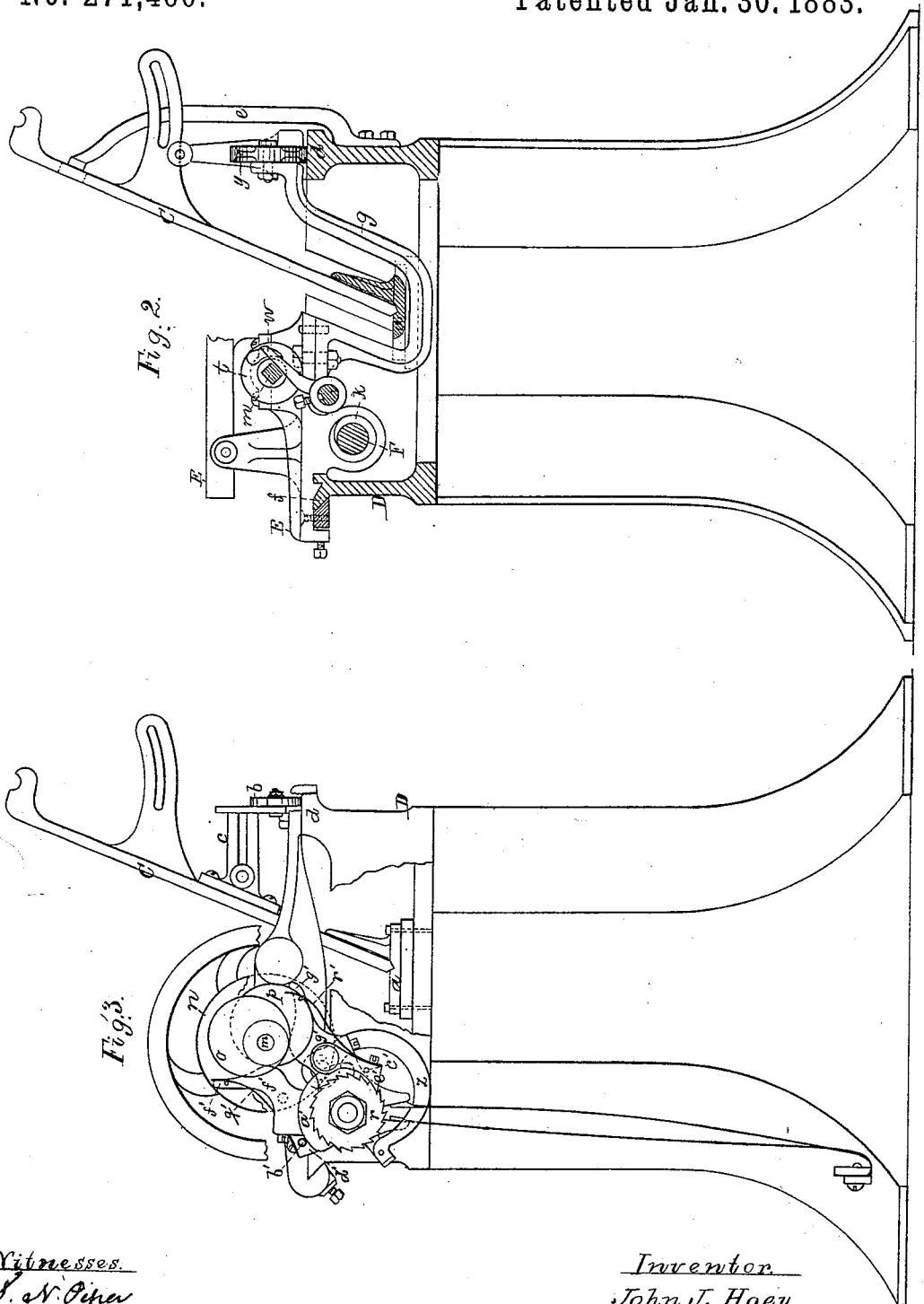

JOHN J. HOEY, OF LAWRENCE, MASSACHUSETTS, ASSIGNOR TO STEDMAN & FULLER, OF SAME PLACE.

MACHINE FOR SETTING CARD-TEETH.

SPECIFICATION forming part of Letters Patent No. 271,460, dated January 30, 1883.

Application filed July 24, 1882. (No model.)

*To all whom it may concern:*

Be it known that I, JOHN J. HOEY, of Lawrence, in the county of Essex and State of Massachusetts, have invented a new and useful Improvement in Machinery for Setting Card-Teeth; and I do hereby declare the same to be described in the following specification and represented in the accompanying drawings, of which—

Figure 1 is a top view of so much of a card-teeth-setting machine as is necessary to exhibit my improvement and the parts to which it is directly applied. Fig. 2 is a vertical and transverse section taken on line A B of Fig. 1. Fig. 3 is an end elevation with some of the parts removed, in order to represent some of those that are necessary to my said improvement, which is defined in the claim hereinafter presented, and may be said to mainly consist in the combination of the material or leather supporting carriage, and the carriage for sustaining the mechanism for punching the leather and forming and inserting the teeth in it, with mechanism for simultaneously and intermittently moving such carriages in opposite directions relatively to each other, each of such carriages being first moved in one and next in the opposite direction longitudinally of the machine, such mechanism for so operating the carriages consisting not only of a screw-threaded shaft having the screw-threads on one half of it pitched in directions opposite to those on the other half of it, but of nuts applied to the shaft and the carriages, and of mechanism for intermittently revolving the shaft and reversing its motion. By so operating the two carriages the work of setting the teeth in the sheet of leather or material to receive them is accomplished in half or about half the time usually taken when only the carriage of the teeth-setting machine is movable across the material, and the latter has no lateral movements, while the said carriage may be moving laterally.

The mechanism for moving the material on its carriage lengthwise of the material is not shown in the drawings, it being the same as commonly used, and has no reference to and makes no part of my invention.

In the drawings, C is the sheet or work supporting carriage, which rests and moves on a guide-rail, $a$, and in a groove thereof, as shown. It is further supported not only by a wheel, $b$, resting on a rail or part, $d$, of the frame D, but by a standard, $e$, which, erected on the frame, as shown in Fig. 2, bears against the carriage to keep it in its inclined position as well while it may be in movement as when it may be at rest. The wheel $b$ is supported by an arm, $c$, extending from the carriage.

E is the carriage for sustaining the mechanism for pricking the work and for forming the teeth and inserting them therein. This carriage is not only supported on the front rail, $f$, of the frame D, but by a curved goose-neck or arm, $g$, extending from it (the said carriage) and provided with a wheel, $y$, to rest and travel on the rail $d$.

Arranged with the two carriages, in manner as represented, is the screw-threaded shaft F, which has extending from its middle part to or near to its ends two screw-threads, $i$ and $k$, one of which is pitched to the right and the other to the left. On these threads are nuts G and H, which are supported by arms extending from the two carriages, one of such arms being shown at $l$. On the screw-shaft being revolved in either direction the two carriages will be simultaneously moved in opposite directions—that is, while one is moving in either direction the other will be moving in the opposite. Thus it will be seen, as the work is supported by a carriage movable as described, the other carriage in each of its movements need be moved only half the distance that would be necessary for it to move were the work to be stationary or have no lateral movement. By thus diminishing the movement of the carriage E, and giving to the work a corresponding movement at the same time a like distance in the opposite direction, each adjustment of the said carriage to the work can be effected in about half the time generally required in machines wherein the work is not supported by a movable carriage.

The next part of the invention to be described is the mechanism for operating the screw-shaft F.

A prismatic shaft, $m$, arranged in the frame

D in manner as represented, has fixed on it a driving-pulley, n. This is the shaft for operating the mechanism for punching the material and forming the teeth and setting them, and it does this in the usual manner. The said shaft carries two eccentrics, o and p. (See Figs. 1 and 3.) Fixed on the screw-shaft F are two ratchet-wheels, q and r. Furthermore, there is applied a sleeve, u, encompassing the shaft m, two cammed wheels, s and t, which, with the sleeve, move on the shaft and are moved thereon with and by the carriage E. These cammed wheels are to alternately operate or move two arms, w and x, applied to a rock-shaft, y, so as to be adjustable thereon lengthwise thereof, according as the width of the sheet to be set with teeth may require. Fixed on the said rock-shaft y is a curved arm, z. (See Figs. 1 and 3.) A cam, a', turning freely on the screw-shaft, is connected with the said curved arm, so as to be turned thereby on the shaft, such cam being arranged directly between and against two studs, b' and c', projecting from two pawls, d' and e', that are respectively carried by two arms, f' and g', which turn on the screw-shaft and bear against the periphery of the two eccentrics o and p. By these eccentrics the arms are turned on the shaft, so as to force the pawls forward and cause them to turn their ratchet-wheels. Springs q' r' operate to keep the pawls up to the ratchet-wheels.

The said described mechanism for operating the screw-shaft F—that is, for revolving it intermittently first in one and next in the opposite direction to cause the carriage E to be moved intermittently and in opposite directions across the work—is the same as in general use in card-setting machines in which the work has no movements laterally, and therefore further description of such mechanism or its mode of operation is not essential, as such will be well understood by any person skilled in the construction and use of card-teeth-setting machines.

As the screw-shaft has mechanism for intermittently revolving it first in one and next in the opposite direction, it will be seen that the two carriages C and E will have intermittent lateral movements imparted to them, and that each of them in so moving will move a like distance in a direction opposite to that of the other.

From the above it will be seen that in carrying out my invention I have not only provided the screw-shaft of a card-setting machine with two screw-threads arranged on it and pitched in opposite directions, as explained, but I have added to the machine the movable carriage C for supporting the work, and have adapted such carriage to be operated by one of the screw-threads and the carriage E to be actuated by the other of such threads, and that thereby I am enabled to attain new and useful results, as stated.

What, therefore, I claim as my invention is as follows, viz:

The combination of the material or sheet of leather supporting carriage, and the carriage for sustaining the mechanism for punching the leather and forming the teeth and setting them therein, with mechanism for simultaneously and intermittently moving such carriages laterally in opposite directions, all being substantially as set forth.

JOHN J. HOEY.

Witnesses:
R. H. EDDY,
S. N. PIPER.